United States Patent
Nagakura et al.

(10) Patent No.: US 10,143,894 B2
(45) Date of Patent: Dec. 4, 2018

(54) GOLF BALL

(71) Applicant: Dunlop Sports Co. Ltd., Kobe-shi, Hyogo (JP)

(72) Inventors: Hikaru Nagakura, Kobe (JP); Kazuyoshi Shiga, Kobe (JP); Chiemi Mikura, Kobe (JP); Takahiro Shigemitsu, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/620,000

(22) Filed: Jun. 12, 2017

(65) Prior Publication Data

US 2018/0001153 A1 Jan. 4, 2018

(30) Foreign Application Priority Data

Jun. 30, 2016 (JP) .................. 2016-130633
Nov. 29, 2016 (JP) .................. 2016-231157

(51) Int. Cl.
*A63B 37/04* (2006.01)
*A63B 37/06* (2006.01)
*A63B 37/00* (2006.01)
*C08L 21/00* (2006.01)

(52) U.S. Cl.
CPC ...... *A63B 37/0063* (2013.01); *A63B 37/0051* (2013.01); *A63B 37/0074* (2013.01); *C08L 21/00* (2013.01); *A63B 37/0077* (2013.01)

(58) Field of Classification Search
USPC .................................. 473/351–378
See application file for complete search history.

(56) References Cited

U.S. PATENT DOCUMENTS

| 5,018,740 A | * | 5/1991 | Sullivan | ............ A63B 37/0003 260/998.14 |
| 6,943,208 B2 | * | 9/2005 | Higuchi | ............... C08K 5/0016 473/371 |

(Continued)

FOREIGN PATENT DOCUMENTS

| JP | 2008-212681 A | 9/2008 |
| JP | 2013-27487 A | 2/2013 |
| JP | 2013-27488 A | 2/2013 |

*Primary Examiner* — Alvin Hunter
(74) *Attorney, Agent, or Firm* — Birch, Stewart, Kolasch & Birch, LLP

(57) ABSTRACT

An object of the present invention is to provide a golf ball having excellent flying performance on driver shots. The present invention provides a golf ball having a spherical core and at least one cover layer covering the spherical core, wherein the spherical core is formed from a rubber composition containing: (a) a base rubber, (b) an α,β-unsaturated carboxylic acid having 3 to 8 carbon atoms and/or a metal salt thereof as a co-crosslinking agent, (c) a crosslinking initiator, (d) an unsaturated fatty acid and/or a metal salt thereof (excluding an α,β-unsaturated carboxylic acid having 3 to 8 carbon atoms and/or a metal salt thereof), and (e) a saturated fatty acid and/or a metal salt thereof, provided that the rubber composition further contains (f) a metal compound in the case of containing only (b) the α,β-unsaturated carboxylic acid having 3 to 8 carbon atoms as the co-crosslinking agent.

19 Claims, 1 Drawing Sheet

(56) References Cited

U.S. PATENT DOCUMENTS

| | | | |
|---|---|---|---|
| 7,067,572 B2* | 6/2006 | Higuchi | C08F 279/02 473/371 |
| 7,838,584 B2* | 11/2010 | Manami | A63B 37/0023 473/373 |
| 9,302,158 B2* | 4/2016 | Shindo | A63B 37/0063 |
| 9,731,167 B2* | 8/2017 | Tachibana | A63B 37/0022 |
| 2008/0214324 A1* | 9/2008 | Nanba | A63B 37/0063 473/372 |
| 2012/0142453 A1 | 6/2012 | Mikura et al. | |
| 2012/0172149 A1 | 7/2012 | Mikura et al. | |
| 2015/0273276 A1* | 10/2015 | Isogawa | C08G 18/10 473/374 |
| 2016/0184650 A1* | 6/2016 | Tachibana | A63B 37/0022 473/373 |

* cited by examiner

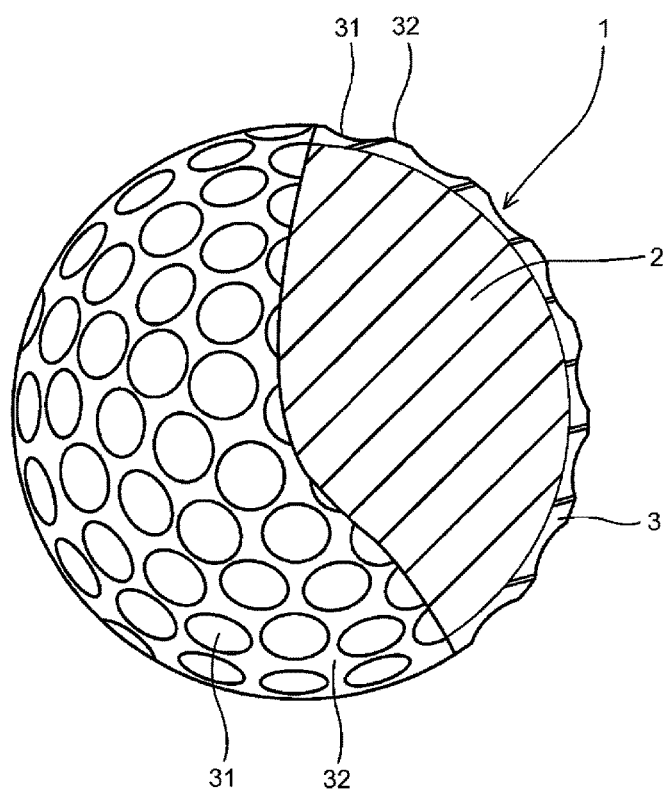

GOLF BALL

FIELD OF THE INVENTION

The present invention relates to a golf ball travelling a great flight distance on driver shots, and more specifically relates to a technology for improving a core of a golf ball.

DESCRIPTION OF THE RELATED ART

As a method for improving a flight distance of a golf ball on driver shots, for example, there are methods of using a core having high resilience and using a core having a hardness distribution in which the hardness increases toward the surface of the core from the center thereof. The former method has an effect of enhancing an initial speed, and the latter method has an effect of a higher launch angle and a lower spin rate. A golf ball having a higher launch angle and a low spin rate travels a great distance.

As a technology for improving resilience of a core, there is a method of adding an organic sulfur compound in a rubber composition which is a constituent element of the core. As the technology for improving resilience of the core, for example, Japanese Patent Publication No. 2008-212681 A discloses a golf ball comprising a crosslinked product of a rubber composition as a constituent element, wherein the rubber composition contains, as an essential component, a filler, an organic peroxide, and an α,β-unsaturated carboxylic acid and/or a metal salt thereof in a base rubber, and further contains a copper salt of a saturated or unsaturated fatty acid (refer to claim 1 and paragraphs 0022, 0023 in Japanese Patent Publication No. 2008-212681 A).

Further, as the technology for improving a flight distance on driver shots, Japanese Patent Publication No. 2013-27487 A and No. 2013-27488 A disclose a golf ball having a spherical core and at least one cover layer covering the spherical core, wherein the spherical core is formed from a rubber composition containing: (a) a base rubber, (b) an α,β-unsaturated carboxylic acid having 3 to 8 carbon atoms and/or a metal salt thereof as a co-crosslinking agent, (c) a crosslinking initiator, and (d) a carboxylic acid having 4 to 30 carbon atoms or a carboxylic acid salt having 4 to 30 carbon atoms, provided that the rubber composition further contains (e) a metal compound in the case of containing only (b) the α,β-unsaturated carboxylic acid having 3 to 8 carbon atoms as the co-crosslinking agent (refer to claim 1 and paragraphs 0035 to 0039 in Japanese Patent Publication No. 2013-27487 A; claim 1 and paragraphs 0036 to 0040 in Japanese Patent Publication No. 2013-27488 A).

SUMMARY OF THE INVENTION

An object of the present invention is to provide a golf ball travelling a great flight distance on driver shots.

The present invention that has solved the above problems provides a golf ball having a spherical core and at least one cover layer covering the spherical core, wherein the spherical core is formed from a rubber composition containing: (a) a base rubber, (b) an α,β-unsaturated carboxylic acid having 3 to 8 carbon atoms and/or a metal salt thereof as a co-crosslinking agent, (c) a crosslinking initiator, (d) an unsaturated fatty acid and/or a metal salt thereof (excluding an α,β-unsaturated carboxylic acid having 3 to 8 carbon atoms and/or a metal salt thereof), and (e) a saturated fatty acid and/or a metal salt thereof, provided that the rubber composition further contains (f) a metal compound in the case of containing only (b) the α,β-unsaturated carboxylic acid having 3 to 8 carbon atoms as the co-crosslinking agent. If (d) the unsaturated fatty acid and/or the metal salt thereof and (e) the saturated fatty acid and/or the metal salt thereof are used in combination in the rubber composition, the obtained golf ball travels a great flight distance on driver shots.

According to the present invention, a golf ball travelling a great flight distance on driver shots is obtained.

BRIEF DESCRIPTION OF THE DRAWINGS

FIG. 1 is a partially cutaway sectional view showing a golf ball according to one embodiment of the present invention;

DESCRIPTION OF THE PREFERRED EMBODIMENT

The present invention provides a golf ball having a spherical core and at least one cover layer covering the spherical core, wherein the spherical core is formed from a rubber composition containing: (a) a base rubber, (b) an α,β-unsaturated carboxylic acid having 3 to 8 carbon atoms and/or a metal salt thereof as a co-crosslinking agent, (c) a crosslinking initiator, (d) an unsaturated fatty acid and/or a metal salt thereof (excluding an α,β-unsaturated carboxylic acid having 3 to 8 carbon atoms and/or a metal salt thereof), and (e) a saturated fatty acid and/or a metal salt thereof, provided that the rubber composition further contains (f) a metal compound in the case of containing only (b) the α,β-unsaturated carboxylic acid having 3 to 8 carbon atoms as the co-crosslinking agent.

((a) Base Rubber)

As (a) the base rubber, natural rubber and/or synthetic rubber may be used. For example, polybutadiene rubber, natural rubber, polyisoprene rubber, styrene polybutadiene rubber, ethylene-propylene-diene rubber (EPDM), or the like may be used. These rubbers may be used solely, or two or more of these rubbers may be used in combination. Typically preferred of them is a high cis-polybutadiene having a cis-1,4 bond in an amount of 40 mass % or more, more preferably 80 mass % or more, even more preferably 90 mass % or more, in view of its superior resilience property. The amount of the high cis-polybutadiene in (a) the base rubber is preferably 50 mass % or more, and more preferably 70 mass % or more.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene is preferably one synthesized using a rare earth element catalyst. When a neodymium catalyst, which employs a neodymium compound of a lanthanum series rare earth element compound, is used, a polybutadiene rubber having a cis-1,4 bond in a high amount and a 1,2-vinyl bond in a low amount is obtained with excellent polymerization activity. Such a polybutadiene rubber is particularly preferred.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The rubber composition preferably includes at least two kinds of the high-cis polybutadiene having a Mooney viscosity ($ML_{1+4}$ (100° C.)) different from each other as (a) the base rubber, and more preferably includes two kinds of the high-cis polybutadiene. In the case of including two kinds of the high-cis polybutadiene, it is preferred that the first high-cis polybutadiene has a Mooney viscosity ($ML_{1+4}$ (100° C.)) of less than 50, and the second high-cis polybutadiene has a Mooney viscosity ($ML_{1+4}$ (100° C.)) of 50 or more.

The Mooney viscosity ($ML_{1+4}$ (100° C.)) of the first high-cis polybutadiene is preferably 30 or more, more preferably 32 or more, even more preferably 35 or more, and is preferably less than 50, more preferably 49 or less, even more preferably 48 or less. The Mooney viscosity ($ML_{1+4}$ (100° C.)) of the second high-cis polybutadiene is preferably 50 or more, more preferably 52 or more, even more preferably 54 or more, and is preferably 100 or less, more preferably 90 or less, even more preferably 80 or less, most preferably 70 or less.

In (a) the base rubber, the mass ratio of the first high-cis polybutadiene to the second high-cis polybutadiene (first high-cis polybutadiene/second high-cis polybutadiene) is preferably 0.3 or more, more preferably 0.5 or more, even more preferably 0.7 or more, and is preferably 3.0 or less, more preferably 2.0 or less, even more preferably 1.5 or less.

The rubber composition also preferably includes the polybutadiene rubber together with a polyisoprene rubber as (a) the base rubber. The Mooney viscosity ($ML_{1+4}$ (100° C.)) of the polyisoprene rubber is preferably 55 or more, more preferably 60 or more, even more preferably 65 or more, and is preferably 120 or less, more preferably 110 or less, even more preferably 100 or less.

In (a) the base rubber, the mass ratio of the polybutadiene rubber to the polyisoprene rubber (polybutadiene rubber/polyisoprene rubber) is preferably 1 or more, more preferably 2 or more, even more preferably 4 or more, and is preferably 20 or less, more preferably 15 or less, even more preferably 10 or less.

((b) Co-Crosslinking Agent)

(b) An $\alpha,\beta$-unsaturated carboxylic acid having 3 to 8 carbon atoms and/or a metal salt thereof is blended into the rubber composition as a co-crosslinking agent, and has an action of crosslinking a rubber molecule by graft polymerization to a base rubber molecular chain. The number of the carbon atoms of the $\alpha,\beta$-unsaturated carboxylic acid used as (b) the co-crosslinking agent preferably ranges from 3 to 8, more preferably ranges from 3 to 6, and is even more preferably 3 or 4. The $\alpha,\beta$-unsaturated carboxylic acid having 3 to 8 carbon atoms and/or the metal salt thereof may be used solely or as a mixture of at least two of them.

The $\alpha,\beta$-unsaturated carboxylic acid having 3 to 8 carbon atoms includes, for example, acrylic acid, methacrylic acid, fumaric acid, maleic acid, crotonic acid, and the like. In the case that the rubber composition contains only the $\alpha,\beta$-unsaturated carboxylic acid having 3 to 8 carbon atoms as the co-crosslinking agent, the rubber composition further contains (f) a metal compound as an essential component. By neutralizing the $\alpha,\beta$-unsaturated carboxylic acid having 3 to 8 carbon atoms with the metal compound in the rubber composition, essentially the same effect as the case where the metal salt of the $\alpha,\beta$-unsaturated carboxylic acid having 3 to 8 carbon atoms is used as the co-crosslinking agent, is obtained.

Examples of the metal constituting the metal salt of the $\alpha,\beta$-unsaturated carboxylic acid having 3 to 8 carbon atoms include: a monovalent metal ion such as sodium, potassium, lithium or the like; a divalent metal ion such as magnesium, calcium, zinc, barium, cadmium or the like; a trivalent metal ion such as aluminum or the like; and other metal ion such as tin, zirconium or the like. The above metal ion may be used solely or as a mixture of at least two of them. Among these metal ions, the divalent metal ion such as magnesium, calcium, zinc, barium, cadmium or the like are preferable. Use of the divalent metal salt of the $\alpha,\beta$-unsaturated carboxylic acid having 3 to 8 carbon atoms easily generates a metal crosslinking between the rubber molecules. Especially, as the divalent metal salt, the zinc salt of the $\alpha,\beta$-unsaturated carboxylic acid having 3 to 8 carbon atoms is preferable, zinc acrylate is more preferable, because they enhance the resilience of the resultant golf ball. It is noted that in the case that the $\alpha,\beta$-unsaturated carboxylic acid having 3 to 8 carbon atoms and the metal salt thereof are used in combination as the co-crosslinking agent, (f) the metal compound may be used as an optional component.

The amount of (b) the $\alpha,\beta$-unsaturated carboxylic acid having 3 to 8 carbon atoms and/or the metal salt thereof is preferably 15 parts by mass or more, more preferably 20 parts by mass or more, even more preferably 25 parts by mass or more, and is preferably 50 parts by mass or less, more preferably 45 parts by mass or less, even more preferably 35 parts by mass or less, with respect to 100 parts by mass of (a) the base rubber. If the amount of (b) the $\alpha,\beta$-unsaturated carboxylic acid having 3 to 8 carbon atoms and/or the metal salt thereof is less than 15 parts by mass, the amount of (c) the crosslinking initiator which will be described later must be increased in order to obtain the appropriate hardness of the constituting member formed from the rubber composition, which tends to cause the lower resilience of the golf ball. On the other hand, if the amount of (b) the $\alpha,\beta$-unsaturated carboxylic acid having 3 to 8 carbon atoms and/or the metal salt thereof exceeds 50 parts by mass, the constituting member formed from the rubber composition becomes excessively hard, which tends to cause the lower shot feeling of the golf ball.

As (b) the $\alpha,\beta$-unsaturated carboxylic acid having 3 to 8 carbon atoms and/or the metal salt thereof, an $\alpha,\beta$-unsaturated carboxylic acid having 3 to 8 carbon atoms and/or a metal salt thereof, the surface of which is covered with a saturated fatty acid, may be used. In this case, the saturated fatty acid used for the surface treatment is regarded as a saturated fatty acid constituting the (e) component which will be described later.

[(c) Crosslinking Initiator]

(c) The crosslinking initiator is blended to crosslink (a) the base rubber. As (c) the crosslinking initiator, an organic peroxide is suitable. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, di-t-butyl peroxide, and the like. These organic peroxides may be used solely, or two or more of these organic peroxides may be used in combination. Among them, dicumyl peroxide is preferably used.

The amount of (c) the crosslinking initiator is preferably 0.2 part by mass or more, more preferably 0.5 part by mass or more, even more preferably 0.7 part by mass or more, and is preferably 5.0 parts by mass or less, more preferably 2.5 parts by mass or less, even more preferably 2.0 parts by mass or less, most preferably 0.9 part by mass or less, with respect to 100 parts by mass of (a) the base rubber. If the amount of (c) the crosslinking initiator is less than 0.2 part by mass, the constituting member formed from the rubber composition becomes so soft that the golf ball may have the lower resilience. If the amount of (c) the crosslinking initiator exceeds 5.0 parts by mass, the amount of (b) the co-crosslinking agent which has been described above must be decreased in order to obtain the appropriate hardness of the constituting member formed from the rubber composition, resulting in the insufficient resilience or worse durability of the golf ball.

[(d) Unsaturated Fatty Acid and/or Metal Salt Thereof]

(d) The unsaturated fatty acid and/or the metal salt thereof is an aliphatic carboxylic acid having at least one unsaturated bond in the hydrocarbon chain and/or a metal salt thereof. As (d) the unsaturated fatty acid and/or the metal salt thereof, a monocarboxylic acid is preferable. It is noted that (d) the unsaturated fatty acid and/or the metal salt thereof excludes (b) the α,β-unsaturated carboxylic acid having 3 to 8 carbon atoms and/or the metal salt thereof used as the co-crosslinking agent.

The number of the carbon atoms of (d) the unsaturated fatty acid and/or the metal salt thereof is preferably 4 or more, more preferably 5 or more, even more preferably 8 or more, most preferably 12 or more, and is preferably 33 or less, more preferably 30 or less, even more preferably 27 or less, most preferably 26 or less. If the (d) component is an unsaturated fatty acid having 33 or less carbon atoms and/or a metal salt thereof, the addition reaction with the (b) component easily occurs, and thus the obtained spherical core has higher resilience.

The amount of the carbon-carbon double bond per unit mass of (d) the unsaturated fatty acid and/or the metal salt thereof is preferably 1.00 mmol/g or more, more preferably 1.50 mmol/g or more, even more preferably 2.00 mmol/g or more, and is preferably 10.00 mmol/g or less, more preferably 9.00 mmol/g or less, even more preferably 8.00 mmol/g or less. If the amount of the carbon-carbon double bond per unit mass of the (d) component is 1.00 mmol/g or more, the addition reaction with the (b) component easily occurs, and thus the obtained spherical core has higher resilience. If the amount of the carbon-carbon double bond per unit mass of the (d) component is 10.00 mmol/g or less, the obtained spherical core has higher resilience.

The amount of the carbon-carbon double bonds of (d) the unsaturated fatty acid and/or the metal salt thereof is preferably 1 or more, and is preferably 4 or less, more preferably 2 or less, even more preferably 1. If the (d) component is an unsaturated fatty acid having 4 or less carbon-carbon double bonds and/or a metal salt thereof, the addition reaction with the (b) component easily occurs, and thus the obtained spherical core has higher resilience.

(d) The unsaturated fatty acid and/or the metal salt thereof is preferably an unsaturated fatty acid represented by the formula (1) and/or a metal salt thereof.

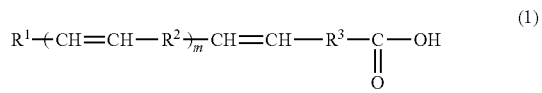

(In the formula (1), $R^1$ represents a hydrogen atom, or an alkyl group having 1 to 30 carbon atoms and optionally having a substituent. $R^2$ represents an alkylene group having 1 to 28 carbon atoms and optionally having a substituent. $R^3$ represents a single bond, or an alkylene group having 1 to 30 carbon atoms and optionally having a substituent. m represents a natural number ranging from 0 to 5. In the case that m ranges from 2 to 5, plural $R^2$ may be identical to or different from each other.)

The alkyl group having 1 to 30 carbon atoms represented by $R^1$ may have a branched structure or cyclic structure, and the linear alkyl group is preferable. The number of the carbon atoms of the alkyl group is preferably 1 or more, more preferably 3 or more, even more preferably 5 or more, and is preferably 25 or less, more preferably 23 or less, even more preferably 21 or less. Examples of the substituent of the alkyl group having 1 to 30 carbon atoms represented by $R^1$ include a hydroxy group.

The alkylene group having 1 to 28 carbon atoms represented by $R^2$ may have a branched structure or cyclic structure, and the linear alkylene group is preferable. The number of the carbon atoms of the alkylene group is preferably 1 or more, more preferably 3 or more, even more preferably 5 or more, and is preferably 25 or less, more preferably 23 or less, even more preferably 21 or less. Examples of the substituent of the alkylene group having 1 to 28 carbon atoms represented by $R^2$ include a hydroxy group.

The alkylene group having 1 to 30 carbon atoms represented by $R^3$ may have a branched structure or cyclic structure, and the linear alkylene group is preferable. The number of the carbon atoms of the alkylene group is preferably 2 or more, more preferably 3 or more, even more preferably 4 or more, and is preferably 25 or less, more preferably 23 or less, even more preferably 21 or less. Examples of the substituent of the alkylene group having 1 to 30 carbon atoms represented by $R^3$ include a hydroxy group.

The above m is preferably 3 or less, more preferably 2 or less, even more preferably 1 or less, and most preferably 0.

As the compound represented by the formula (1), the compound represented by the following formula (2) or (3) is more preferable.

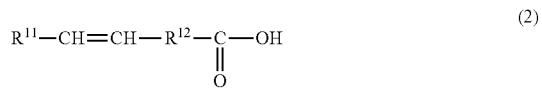

($R^{11}$ represents a hydrogen atom, or an alkyl group having 1 to 30 carbon atoms and optionally having a substituent.

$R^{12}$ represents a single bond, or an alkylene group having 1 to 30 carbon atoms and optionally having a substituent.)

The alkyl group having 1 to 30 carbon atoms represented by $R^{11}$ may have a branched structure or cyclic structure, and the linear alkyl group is preferable. Examples of the substituent of the alkyl group having 1 to 30 carbon atoms represented by $R^{11}$ include a hydroxy group. The alkylene group having 1 to 30 carbon atoms represented by $R^{12}$ may have a branched structure or cyclic structure, and the linear alkylene group is preferable. Examples of the substituent of the alkylene group having 1 to 30 carbon atoms represented by $R^{12}$ include a hydroxy group.

In the formula (2), when $R^{11}$ is an alkyl group, the ratio of the carbon atom number of $R^{11}$ to the carbon atom number of $R^{12}$ ($R^{11}/R^{12}$) is preferably 0.1 or more, more preferably 0.5 or more, even more preferably 0.8 or more, and is preferably 10.0 or less, more preferably 5.0 or less, even more preferably 1.3 or less. If the ratio of the carbon atom number ($R^{11}/R^{12}$) falls within the above range, the addition reaction with the (b) component efficiently occurs, and thus the obtained spherical core has higher resilience.

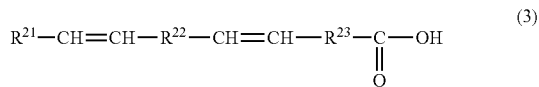

(3)

($R^{21}$ represents a hydrogen atom, or an alkyl group having 1 to 27 carbon atoms and optionally having a substituent. $R^{22}$ represents an alkylene group having 1 to 28 carbon atoms and optionally having a substituent. $R^{23}$ represents a single bond, or an alkylene group having 1 to 27 carbon atoms and optionally having a substituent.))

The alkyl group having 1 to 27 carbon atoms represented by $R^{21}$ may have a branched structure or cyclic structure, and the linear alkyl group is preferable. Examples of the substituent of the alkyl group having 1 to 27 carbon atoms represented by $R^{21}$ include a hydroxy group. The alkylene group having 1 to 28 carbon atoms represented by $R^{22}$ may have a branched structure or cyclic structure, and the linear alkylene group is preferable. Examples of the substituent of the alkylene group having 1 to 28 carbon atoms represented by $R^{22}$ include a hydroxy group. The alkylene group having 1 to 27 carbon atoms represented by $R^{23}$ may have a branched structure or cyclic structure, and the linear alkylene group is preferable. Examples of the substituent of the alkylene group having 1 to 27 carbon atoms represented by $R^{23}$ include a hydroxy group.

The number of the carbon atoms of the alkylene group represented by $R^{22}$ is preferably 25 or less, more preferably 20 or less, and even more preferably 15 or less. As the alkylene group represented by $R^{22}$, methylene group and ethylene group are preferable, methylene group is more preferable.

In the formula (3), when $R^{21}$ is an alkyl group, the ratio of the carbon atom number of $R^{21}$ to the carbon atom number of $R^{23}$ ($R^{21}/R^{23}$) is preferably 0.1 or more, more preferably 0.5 or more, even more preferably 0.8 or more, and is preferably 10.0 or less, more preferably 5.0 or less, even more preferably 1.3 or less. If the ratio of the carbon atom number ($R^{21}/R^{23}$) falls within the above range, the addition reaction with the (b) component efficiently occurs, and thus the obtained spherical core has higher resilience.

(d) The unsaturated fatty acid and/or the metal salt thereof is preferably a linear unsaturated fatty acid and/or a salt thereof. Examples of (d) the unsaturated fatty acid and/or the metal salt thereof include an unsaturated fatty acid having a carbon-carbon double bond at the terminal of the hydrocarbon chain and/or a metal salt thereof, an unsaturated fatty acid having at least one carbon-carbon double bond with a trans configuration and/or a metal salt thereof, and an unsaturated fatty acid having at least one carbon-carbon double bond with a cis configuration and/or a metal salt thereof. As (d) the unsaturated fatty acid and/or the metal salt thereof, the unsaturated fatty acid having at least one carbon-carbon double bond with a cis configuration and/or the metal salt thereof is more preferable. If the (d) component has the above structure, the reactivity of the addition reaction with the (b) component is higher and thus the obtained spherical core has further enhanced resilience.

In the case that (d) the unsaturated fatty acid and/or the metal salt thereof is an unsaturated fatty acid having 5 or more carbon atoms and/or a metal salt thereof, (d) the unsaturated fatty acid and/or the metal salt thereof preferably has the first carbon-carbon double bond at the second or later carbon, more preferably at the third or later carbon, and even more preferably at the fourth or later carbon, counted from the carboxyl group side thereof. If (d) the unsaturated fatty acid and/or the metal salt thereof is an unsaturated fatty acid having the first carbon-carbon double bond at the carbon in the above range and/or a metal salt thereof, the addition reaction with the (b) component easily occurs, and thus the obtained spherical core has higher resilience.

Specific examples of the unsaturated fatty acid constituting (d) the unsaturated fatty acid and/or the metal salt thereof (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), triacontenoic acid (C30), hentriacontenoic acid (C31), dotriacontenoic acid (C32), and tritriacontenoic acid (C33).

Specific examples of the unsaturated fatty acid constituting (d) the unsaturated fatty acid and/or the metal salt thereof (common name) include an unsaturated fatty acid having a double bond at the terminal such as 4-pentenoic acid (C5, monounsaturated fatty acid), 5-hexenoic acid (C6, monounsaturated fatty acid), 6-heptenoic acid (C7, monounsaturated fatty acid), 7-octenoic acid (C8, monounsaturated fatty acid), 8-nonenoic acid (C9, monounsaturated fatty acid), 9-decenoic acid (C10, monounsaturated fatty acid), 10-undecylenic acid (C11, monounsaturated fatty acid) and so on; an unsaturated fatty acid having a double bond at the position other than the terminal such as myristoleic acid (C14, cis-9-monounsaturated fatty acid), palmitoleic acid (C16, cis-9-monounsaturated fatty acid), stearidonic acid (C18, 6,9,12,15-tetraunsaturated fatty acid), vaccenic acid (C18, cis-11-monounsaturated fatty acid), oleic acid (C18, cis-9-monounsaturated fatty acid), elaidic acid (C18, trans-9-monounsaturated fatty acid), linoleic acid (C18, cis-9-cis-12-diunsaturated fatty acid), α-linolenic acid (C18, 9,12,15-triunsaturated fatty acid), γ-linolenic acid (C18, 6,9,12-triunsaturated fatty acid), gadoleic acid (C20, cis-9-monounsaturated fatty acid), eicosenoic acid (C20, cis-11-monounsaturated fatty acid), eicosadienoic acid (C20, cis- 11-cis-14-diunsaturated fatty acid), arachidonic acid (C20, 5,8,11,14-tetraunsaturated fatty acid), icosapentaenoic acid (C20, 5,8,11,14,17-pentaunsaturated fatty acid), erucic acid (C22, cis-13-monounsaturated fatty acid), docosahexaenoic acid (C22, 4,7,10,13,16,19-hexaunsaturated fatty acid), nervonic acid (C24, cis-15-monounsaturated fatty acid) and so on; and an unsaturated fatty acid having a hydroxy group such as ricinoleic acid (C18, cis-9-monounsaturated fatty acid) and so on.

Among them, as the unsaturated fatty acid constituting (d) the unsaturated fatty acid and/or the metal salt thereof, undecylenic acid (C11, monounsaturated fatty acid), myristoleic acid (C14, monounsaturated fatty acid), palmitoleic acid (C16, monounsaturated fatty acid), oleic acid (C18, monounsaturated fatty acid), linoleic acid (C18, diunsaturated fatty acid), eicosenoic acid (C20, monounsaturated fatty acid), erucic acid (C22, monounsaturated fatty acid), nervonic acid (C24, monounsaturated fatty acid), and ricinoleic acid (C18, cis-9-monounsaturated fatty acid) are preferable.

Examples of the metal constituting (d) the unsaturated fatty acid and/or the metal salt thereof include a monovalent metal ion such as sodium, potassium, lithium or the like; a divalent metal ion such as magnesium, calcium, zinc, barium, cadmium or the like; a trivalent metal ion such as aluminum or the like; and other metal ion such as tin, zirconium or the like. The metal component may be used solely or as a mixture of at least two of them. Among them, as the metal component, the divalent metal ion such as magnesium, calcium, zinc, barium, cadmium or the like is preferable, and zinc is particularly preferable. If (d) the divalent metal salt of the unsaturated fatty acid is used, the obtained spherical core has higher resilience. (d) The unsaturated fatty acid and/or the metal salt thereof may be used solely or as a mixture of at least two of them.

The amount of (d) the unsaturated fatty acid and/or the metal salt thereof is preferably 1 part by mass or more, more preferably 2 parts by mass or more, even more preferably 3 parts by mass or more, and is preferably 35 parts by mass or less, more preferably 30 parts by mass or less, even more preferably 25 parts by mass or less, particularly preferably 20 parts by mass or less, most preferably 17 parts by mass or less, with respect to 100 parts by mass of (a) the base rubber. If the amount of the (d) component is 1 part by mass or more, the effect of adding the (d) component is sufficiently exerted, and thus the obtained spherical core has higher resilience. If the amount of the (d) component is 35 parts by mass or less, the spherical core does not become excessively soft, and thus the durability and high resilience of the golf ball do not deteriorate.

[(e) Saturated Fatty Acid and/or Metal Salt Thereof]

The rubber composition further contains (e) a saturated fatty acid and/or a metal salt thereof. If (d) the unsaturated fatty acid and/or the metal salt thereof and (e) the saturated fatty acid and/or the metal salt thereof are used in combination, the flight distance on driver shots is further enhanced. The fatty acid component constituting (e) the saturated fatty acid and/or the metal salt thereof is not particularly limited, and may be either a linear saturated fatty acid or a branched saturated fatty acid. The linear saturated fatty acid is preferable. (e) The saturated fatty acid and/or the metal salt thereof may be used solely or as a mixture of at least two of them.

The number of the carbon atoms of the fatty acid component constituting (e) the saturated fatty acid and/or the metal salt thereof is preferably 4 or more, more preferably 6 or more, even more preferably 8 or more, and is preferably 30 or less, more preferably 28 or less, even more preferably 26 or less, most preferably 17 or less.

Examples of the saturated fatty acid include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, henicosanoic acid, docosanoic acid, tricosanoic acid, tetracosanoic acid, pentacosanoic acid, hexacosanoic acid, heptacosanoic acid, octacosanoic acid, nonacosanoic acid, and triacontanoic acid (C30).

Examples of the cation component of the saturated fatty acid metal salt include a monovalent metal ion such as sodium, potassium, lithium, silver and the like; a divalent metal ion such as magnesium, calcium, zinc, barium, cadmium, copper, cobalt, nickel, manganese and the like; a trivalent metal ion such as aluminum, iron and the like; and other metal ion such as tin, zirconium, titanium and the like. The cation component may be used solely or as a mixture of at least two of them.

The amount of (e) the saturated fatty acid and/or the metal salt thereof is preferably 1 part by mass or more, more preferably 2 parts by mass or more, even more preferably 3 parts by mass or more, and is preferably 35 parts by mass or less, more preferably 30 parts by mass or less, even more preferably 25 parts by mass or less, most preferably 10 parts by mass or less, with respect to 100 parts by mass of (a) the base rubber. If the amount of (e) the saturated fatty acid and/or the metal salt thereof is 1 part by mass or more, the dispersibility of each material in the rubber composition is better, and if the amount of (e) the saturated fatty acid and/or the metal salt thereof is 35 parts by mass or less, changes in physical properties of the rubber composition by containing (e) the saturated fatty acid and/or the metal salt thereof, can be suppressed.

In the case that a saturated fatty acid having 4 to 17 carbon atoms and/or a metal salt thereof is used as (e) the saturated fatty acid and/or the metal salt thereof, the amount thereof is preferably 1 part by mass or more, more preferably 2 parts by mass or more, even more preferably 3 parts by mass or more, and is preferably 14 parts by mass or less, more preferably 12 parts by mass or less, even more preferably 10 parts by mass or less, with respect to 100 parts by mass of (a) the base rubber.

In the case that a saturated fatty acid having 18 to 30 carbon atoms and/or a metal salt thereof is used as (e) the saturated fatty acid and/or the metal salt thereof, the amount thereof is preferably 4 parts by mass or more, more preferably 5 parts by mass or more, even more preferably 6 parts by mass or more, and is preferably 35 parts by mass or less, more preferably 30 parts by mass or less, even more preferably 25 parts by mass or less, with respect to 100 parts by mass of (a) the base rubber.

It is noted that there are cases where (b) the α,β-unsaturated carboxylic acid having 3 to 8 carbon atoms and/or the metal salt thereof is treated with zinc stearate or the like to improve the dispersibility to the rubber. In the case of using the co-crosslinking agent whose surface is treated with zinc stearate or the like, the cation component and anion component of zinc stearate or the like used as a surface treating agent is included in the cation component and anion component of the (e) component.

[(f) Metal Compound]

In the case that the rubber composition used in the present invention contains only the α,β-unsaturated carboxylic acid having 3 to 8 carbon atoms as the co-crosslinking agent, the rubber composition further contains (f) a metal compound as an essential component. (f) The metal compound is not particularly limited, as long as it can neutralize (b) the α,β-unsaturated carboxylic acid having 3 to 8 carbon atoms in the rubber composition. Examples of (f) the metal compound include a metal hydroxide such as magnesium hydroxide, zinc hydroxide, calcium hydroxide, sodium hydroxide, lithium hydroxide, potassium hydroxide, copper hydroxide, and the like; a metal oxide such as magnesium oxide, calcium oxide, zinc oxide, copper oxide, and the like; a metal carbonate such as magnesium carbonate, zinc carbonate, calcium carbonate, sodium carbonate, lithium carbonate, potassium carbonate, and the like. (f) The metal compound preferably includes the divalent metal compound, more preferably includes the zinc compound. This is because the divalent metal compound reacts with the α,β-unsaturated carboxylic acid having 3 to 8 carbon atoms, thereby forming a metal crosslinking. In addition, use of the zinc compound provides a golf ball with high resilience. (f) The metal compound may be used solely or as a mixture of at least two of them. The amount of (f) the metal compound may be appropriately adjusted according to the desired degree of neutralization of (b) the α,β-unsaturated carboxylic acid having 3 to 8 carbon atoms and (d) the unsaturated fatty acid.

[(g) Organic Sulfur Compound]

The rubber composition used in the present invention preferably further contains (g) an organic sulfur compound. If the rubber composition contains (g) the organic sulfur compound, the spherical core has further enhanced resilience.

(g) The organic sulfur compound is not particularly limited, as long as it is an organic compound having a sulfur atom in the molecule thereof. Examples of (g) the organic sulfur compound include an organic compound having a thiol group (—SH) or a polysulfide bond with 2 to 4 sulfur atoms (—S—S—, —S—S—S—, or —S—S—S—S—), and a metal salt thereof (—SM, —S-M-S—, —S-M-S—S—, —S—S-M-S—S—, —S-M-S—S—S—, and so on, wherein M is a metal atom). Examples of the metal salt include a metal salt of a monovalent metal such as sodium, potassium, lithium, copper (I), and silver (I), and a metal salt of a divalent metal such as zinc, magnesium, calcium, strontium, barium, titanium (II), manganese (II), iron (II), cobalt (II), nickel (II), zirconium (II), and tin (II). Furthermore, (g) the organic sulfur compound may be any one of an aliphatic compound (such as an aliphatic thiol, an aliphatic thiocarboxylic acid, an aliphatic dithiocarboxylic acid, and an aliphatic polysulfide), a heterocyclic compound, an alicyclic compound (such as an alicyclic thiol, an alicyclic thiocarboxylic acid, an alicyclic dithiocarboxylic acid, and an alicyclic polysulfide), and an aromatic compound.

Examples of (g) the organic sulfur compound include at least one selected from the group consisting of thiols (thiophenols and thionaphthols), polysulfides, thiurams, thiocarboxylic acids, dithiocarboxylic acids, sulfenamides, dithiocarbamates, and thiazoles.

Examples of the thiols include thiophenols and thionaphthols. Examples of the thiophenols include thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol, pentafluorothiophenol, and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol, and the like; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol, pentabromothiophenol, and the like; thiophenols substituted with a iodo group, such as 4-iodothiophenol, 2,5-diiodothiophenol, 2,6-diiodothiophenol, 2,4,5-triiodothiophenol, 2,4,5,6-tetraiodothiophenol, pentaiodothiophenol, and the like; and metal salts thereof. As the metal salt, a zinc salt is preferred.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and their metal salts. Among them, 2-thionaphthol, 1-thionaphthol, and their metal salts are preferred. As the metal salt, a divalent metal salt is preferred, and a zinc salt is more preferred. Specific examples of the metal salt include zinc salt of 1-thionaphthol and zinc salt of 2-thionaphthol.

The polysulfides are organic sulfur compounds having a polysulfide bond, and examples thereof include disulfides, trisulfides and tetrasulfides. As the polysulfides, diphenylpolysulfides are preferred.

Examples of the diphenylpolysulfides include diphenyl disulfide; diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide, bis(pentaiodophenyl) disulfide, and the like; diphenyl disulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, bis(penta-t-butylphenyl) disulfide, and the like; and the like.

Examples of the thiurams include thiuram monosulfides such as tetramethylthiuram monosulfide and the like; thiuram disulfides such as tetramethylthiuram disulfide, tetraethylthiuram disulfide, tetrabutylthiuram disulfide and the like; and thiuram tetrasulfides such as dipentamethylene thiuram tetrasulfide and the like. Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

As (g) the organic sulfur compound, the thiophenols and/or the metal salts thereof, the thionaphthols and/or the metal salt thereof, the diphenyl disulfides, and the thiuram disulfides are preferred, 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, bis(pentabromophenyl) disulfide are more preferred.

(g) The organic sulfur compound may be used solely or as a mixture of at least two of them.

The amount of (g) the organic sulfur compound is preferably 0.05 part by mass or more, more preferably 0.1 part by mass or more, even more preferably 0.2 part by mass or more, and is preferably 5.0 parts by mass or less, more preferably 3.0 parts by mass or less, even more preferably 2.0 parts by mass or less, with respect to 100 parts by mass of (a) the base rubber. If the amount of (g) the organic sulfur compound is less than 0.05 part by mass, the effect of adding (g) the organic sulfur compound may not be obtained and thus the resilience of the golf ball may not be enhanced. In addition, if the amount of (g) the organic sulfur compound exceeds 5.0 parts by mass, the compression deformation amount of the obtained golf ball becomes large and thus the resilience may be lowered.

[Rubber Composition]

The ratio ((d) component/(b) component) of the total molar number of the carbon-carbon double bond in (d) the unsaturated fatty acid and/or the metal salt thereof to the total molar number of the carbon-carbon double bond in (b) the α,β-unsaturated carboxylic acid having 3 to 8 carbon atoms and/or the metal salt thereof is preferably 0.01 or more, more preferably 0.03 or more, even more preferably 0.06 or more, and is preferably 0.20 or less, more preferably 0.18 or less, even more preferably 0.16 or less. If the ratio ((d) component/(b) component) is 0.01 or more, the addition reaction with the (b) component easily occurs, and thus the obtained spherical core has higher resilience. On the other hand, if the ratio ((d) component/(b) component) is 0.20 or less, the durability of the golf ball is maintained while keeping the compression deformation amount of the spherical core unchanged.

The ratio (((d) component+(e) component)/(b) component) of the total molar number of carboxyl groups (—COOH) and carboxylate groups (—COO$^-$) in the (d) component and the (e) component to the total molar number of carboxyl groups and carboxylate groups in the (b) component is preferably 0.01 or more, more preferably 0.02 or more, even more preferably 0.03 or more, and is preferably 0.25 or less, more preferably 0.23 or less, even more preferably 0.21 or less.

The ratio ((d) component/(e) component) of the total molar number of carboxyl groups and carboxylate groups in the (d) component to the total molar number of carboxyl groups and carboxylate groups in the (e) component is preferably 0.10 or more, more preferably 0.20 or more, even more preferably 0.30 or more, and is preferably 2.4 or less, more preferably 2.2 or less, even more preferably 2.0 or less. If the ratio ((d) component/(e) component) is 0.10 or more, the spherical core has better resilience, and if the ratio ((d) component/(e) component) is 2.4 or less, the spherical core having appropriate flexibility is obtained.

The total molar number of carboxyl groups and carboxylate groups in the (d) component used in the rubber composition is preferably 0.001 or more, more preferably 0.010 or more, even more preferably 0.020 or more, and is preferably 0.065 or less, more preferably 0.060 or less, more preferably 0.050 or less, with respect to 100 parts by mass of (a) the base rubber. If the total molar number of carboxyl groups and carboxylate groups in the (d) component falls within the above range, the obtained spherical core has further enhanced resilience.

The total molar number of carboxyl groups and carboxylate groups in the (e) component used in the rubber composition is preferably 0.010 or more, more preferably 0.020 or more, even more preferably 0.030 or more, and is preferably 0.090 or less, more preferably 0.080 or less, more preferably 0.070 or less, with respect to 100 parts by mass of (a) the base rubber. If the total molar number of carboxyl groups and carboxylate groups in the (e) component falls within the above range, the obtained spherical core has further enhanced resilience.

The total molar number of carboxyl groups and carboxylate groups in the (d) component and carboxyl groups and carboxylate groups in the (e) component used in the rubber composition is preferably 0.020 or more, more preferably 0.030 or more, even more preferably 0.040 or more, and is preferably 0.10 or less, more preferably 0.090 or less, more preferably 0.080 or less, with respect to 100 parts by mass of (a) the base rubber. If the total molar number of carboxyl groups and carboxylate groups falls within the above range, the obtained spherical core has further enhanced resilience.

The total amount of (d) the unsaturated fatty acid and/or the metal salt thereof and (e) the saturated fatty acid and/or the metal salt thereof in the rubber composition is preferably 5 parts by mass or more, more preferably 6 parts by mass or more, even more preferably 7 parts by mass or more, and is preferably 20 parts by mass or less, more preferably 18 parts by mass or less, even more preferably 16 parts by mass or less, with respect to 100 parts by mass of (a) the base rubber. If the total amount of the (d) component and the (e) component falls within the above range, the obtained spherical core has further enhanced resilience.

The degree of neutralization (the alkali equivalent of metal ions when the acid equivalent of carboxyl groups and carboxylate groups in the rubber composition is regarded as 100 mole %) of the rubber composition is preferably 100 mole % or more, more preferably 105 mole % or more, even more preferably 108 mole % or more, most preferably 110 mole % or more, and is preferably 300 mole % or less, more preferably 270 mole % or less, even more preferably 250 mole % or less, most preferably 200 mole % or less. If the degree of neutralization is 100 mole % or more, the durability of the golf ball is maintained while keeping the compression deformation amount of the core unchanged. On the other hand, if the degree of neutralization is 300 mole % or less, the obtained spherical core does not become excessively soft, and thus the high resilience of the golf ball does not deteriorate. It is noted that the degree of neutralization of the rubber composition is defined by the following formula.

$$\text{Degree of neutralization (mole \%)}=100\times[\Sigma(\text{mole number of cation component}\times\text{valence of cation component})]/[\Sigma(\text{mole number of anion component}\times\text{valence of anion component})]$$

(in the formula, Σ(mole number of cation component× valence of cation component) is a sum of a product obtained by multiplying the mole number of each metal ion by the valence of each metal ion in the (b) component, a product obtained by multiplying the mole number of each metal ion by the valence of each metal ion in the (d) component, a product obtained by multiplying the mole number of each metal ion by the valence of each metal ion in the (e) component, and a product obtained by multiplying the mole number of each metal ion by the valence of each metal ion in the (f) component; and Σ(mole number of anion component×valence of anion component) is a sum of a total molar number of carboxyl groups and carboxylate groups in the (b) component, a total molar number of carboxyl groups and carboxylate groups in the (d) component, and a total molar number of carboxyl groups and carboxylate groups in the (e) component.)

The rubber composition used in the present invention may further contain additives such as a pigment, a filler for adjusting weight or the like, an antioxidant, a peptizing agent, and a softener, where necessary. Further, the core rubber composition may further contain a rubber powder obtained by pulverizing a golf ball core or offcuts produced when preparing a core.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. The amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The filler blended in the rubber composition is used as a weight adjusting agent for mainly adjusting the weight of the golf ball obtained as a final product. The filler may be blended where necessary. The filler includes, for example, an inorganic filler such as zinc oxide, barium sulfate, calcium carbonate, magnesium oxide, tungsten powder, molybdenum powder, and the like.

The amount of the antioxidant is preferably 0.1 part by mass or more and 1 part by mass or less, with respect to 100 parts by mass of (a) the base rubber. In addition, the amount of the peptizing agent is preferably 0.1 part by mass or more and 5 parts by mass or less, with respect to 100 parts by mass of (a) the base rubber.

The rubber composition used in the present invention may be obtained by mixing and kneading (a) the base rubber, (b) the α,β-unsaturated carboxylic acid having 3 to 8 carbon atoms and/or the metal salt thereof, (c) the crosslinking initiator, (d) the unsaturated aliphatic carboxylic acid and/or the metal salt thereof, (e) the saturated fatty acid and/or the metal salt thereof, and other additives where necessary. The kneading may be conducted, without any limitation, with a publicly known kneading machine such as a kneading roll, a banbury mixer, a kneader, or the like.

The spherical core may be obtained by molding the kneaded rubber composition in a mold. The temperature for molding the spherical core is preferably 120° C. or more, more preferably 150° C. or more, and is preferably 170° C. or less. In addition, the molding pressure preferably ranges from 2.9 MPa to 11.8 MPa. The molding time preferably ranges from 10 minutes to 60 minutes.

[Spherical Core]

The diameter of the spherical core is preferably 34.8 mm or more, more preferably 36.8 mm or more, even more preferably 38.8 mm or more, and is preferably 42.2 mm or less, more preferably 41.8 mm or less, even more preferably 41.2 mm or less, most preferably 40.8 mm or less. If the diameter of the spherical core is 34.8 mm or more, the thickness of the cover does not become too thick and thus the resilience is better. On the other hand, if the diameter of the spherical core is 42.2 mm or less, the thickness of the cover does not become too thin and thus the cover functions well.

When the spherical core has a diameter in a range from 34.8 mm to 42.2 mm, the compression deformation amount of the spherical core (shrinking deformation amount of the spherical core along the compression direction) when a load from an initial load of 98 N to a final load of 1275 N is applied to the spherical core, is preferably 1.90 mm or more, more preferably 2.00 mm or more, even more preferably 2.10 mm or more, and is preferably 5.00 mm or less, more preferably 4.80 mm or less, even more preferably 4.60 mm or less. If the compression deformation amount is 1.90 mm or more, the shot feeling of the golf ball is better, and if the compression deformation amount is 5.00 mm or less, the resilience of the golf ball is better.

The hardness difference (Hs−Ho) between the surface hardness Hs and the center hardness Ho of the spherical core is preferably 1 or more, more preferably 5 or more, even more preferably 7 or more, most preferably 10 or more, and is preferably 90 or less, more preferably 80 or less, even more preferably 70 or less in Shore C hardness. If the hardness difference is large, the golf ball travelling a greater flight distance due to the high launch angle and low spin rate is obtained.

The center hardness Ho of the spherical core is preferably 10 or more, more preferably 15 or more, and even more preferably 20 or more in Shore C hardness. If the center hardness Ho of the spherical core is 10 or more in Shore C hardness, the spherical core does not become excessively soft and thus the resilience thereof is better. In addition, the center hardness Ho of the spherical core is preferably 90 or less, more preferably 80 or less, and even more preferably 70 or less in Shore C hardness. If the center hardness Hoof the spherical core is 90 or less in Shore C hardness, the spherical core does not become excessively hard and thus the shot feeling thereof is better.

The surface hardness Hs of the spherical core is preferably 30 or more, more preferably 40 or more, even more preferably 50 or more, and is preferably 100 or less, more preferably 90 or less, even more preferably 80 or less in Shore C hardness. If the surface hardness Hs of the spherical core is 30 or more in Shore C hardness, the spherical core does not become excessively soft and thus the resilience thereof is better. In addition, if the surface hardness Hs of the spherical core is 100 or less in Shore C hardness, the spherical core does not become excessively hard and thus the shot feeling thereof is better.

[Cover]

The cover of the golf ball according to the present invention is formed from a cover composition comprising a resin component. Examples of the resin component include an ionomer resin; a thermoplastic polyurethane elastomer having a trade name of "Elastollan (registered trademark)" available from BASF Japan Ltd; a thermoplastic polyamide elastomer having a trade name of "Pebax (registered trademark)" available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" available from Mitsubishi Chemical Corporation; and the like.

The ionomer resin includes a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms, and an α,β-unsaturated carboxylic acid ester with a metal ion; or a mixture of those. The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among them, the ionomer resin preferably includes a metal ion-neutralized product of a binary copolymer composed of ethylene-(meth)acrylic acid, and a metal ion-neutralized product of a ternary copolymer composed of ethylene, (meth)acrylic acid, and (meth)acrylic acid ester.

Specific examples of the ionomer resin include trade name "Himilan (registered trademark) (e.g. the binary copolymerized ionomer such as Himilan 1555 (Na), 1557 (Zn), 1605 (Na), 1706 (Zn), 1707 (Na), AM7311 (Mg) and the like; and the ternary copolymerized ionomer such as Himilan 1856 (Na), 1855 (Zn) and the like)" available from Du Pont-Mitsui Polychemicals Co., Ltd.

Specific examples of the ionomer resin further include "Surlyn (registered trademark) (e.g. the binary copolymerized ionomer such as Surlyn 8945 (Na), 9945 (Zn), 8140 (Na), 8150 (Na), 9120 (Zn), 9150 (Zn), 6910 (Mg), 6120 (Mg), 7930 (Li), 7940 (Li), AD8546 (Li) and the like; and the ternary copolymerized ionomer such as Surlyn 8120 (Na), 8320 (Na), 9320 (Zn), 6320 (Mg), HPF 1000 (Mg), HPF 2000 (Mg) and the like)" available from E.I. du Pont de Nemours and Company.

In addition, specific examples of the ionomer resin also include "Iotek (registered trademark) (e.g. the binary copolymerized ionomer such as Iotek 8000 (Na), 8030 (Na), 7010 (Zn), 7030 (Zn) and the like; and the ternary copolymerized ionomer such as Iotek 7510 (Zn), 7520 (Zn) and the like)" available from ExxonMobil Chemical Corporation.

It is noted that Na, Zn, Li, and Mg described in the parentheses after the trade names of the ionomer resins indicate metal types of neutralizing metal ions for the ionomer resins. The ionomer resin may be used solely or as a mixture of two or more of them.

The cover composition constituting the cover of the golf ball according to the present invention preferably contains, as a resin component, a thermoplastic polyurethane elastomer or an ionomer rein. In the case of using the ionomer rein, it is also preferred to use a thermoplastic styrene elastomer together. The amount of the polyurethane or ionomer resin in the resin component of the cover composition is preferably 50 mass % or more, more preferably 60 mass % or more, and even more preferably 70 mass % or more.

In addition to the above mentioned resin component, the cover composition may further contain a pigment component such as a white pigment (e.g. titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or fluorescent brightener; and the like, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. Further, if the amount of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, even more preferably 60 or more, and preferably has a slab hardness of 80 or less, more preferably 70 or less, even more preferably 68 or less in Shore D hardness. If the cover composition has a slab hardness of 50 or more, the obtained golf ball has a higher launch angle and lower spin rate on driver shots and iron shots, and thus travels a greater flight distance. In addition, if the cover composition has a slab hardness of 80 or less, the golf ball excellent in durability is obtained. Further, in case of a so-called spin golf ball which focuses on controllability, the cover composition preferably has a slab hardness of less than 50, and preferably has a slab hardness of 20 or more, more preferably 25 or more, even more preferably 30 or more in Shore D hardness. If the cover composition has a slab hardness of less than 50 in Shore D hardness, the obtained golf ball travels a great flight distance on driver shots due to the core of the present invention, and readily stops on the green due to the high spin rate on approach shots as well. If the cover composition has a slab hardness of 20 or more, the abrasion resistance is enhanced. In case of a plurality of cover layers, the slab hardness of the cover composition constituting each layer may be identical to or different from each other, as long as the slab hardness of each layer falls within the above range.

Examples of the method for molding the cover of the golf ball according to the present invention include a method which comprises molding the cover composition into a hollow shell, covering the core with a plurality of the hollow shells, and subjecting the core with a plurality of the hollow shells to the compression molding (preferably a method which comprises molding the cover composition into a half hollow shell, covering the core with two of the half hollow shells, and subjecting the core with two of the half hollow shells to the compression molding); and a method which comprises injection molding the cover composition directly onto the core.

When molding the cover by the compression molding method, the molding of the half shell may be performed by either the compression molding method or the injection molding method, and the compression molding method is preferred. The compression molding of the cover composition into the half shell may be carried out, for example, under a molding pressure of 1 MPa or more and 20 MPa or less at a molding temperature of −20° C. or more and 70° C. or less relative to the flow beginning temperature of the cover composition. By performing the molding under the above conditions, the half shell having a uniform thickness can be formed. Examples of the method for molding the cover using the half shells include a method which comprises covering the core with two of the half shells and subjecting the core with two of the half shells to the compression molding. The compression molding of the half shells into the cover may be carried out, for example, under a molding pressure of 0.5 MPa or more and 25 MPa or less at a molding temperature of −20° C. or more and 70° C. or less relative to the flow beginning temperature of the cover composition. By performing the molding under the above conditions, a golf ball cover having a uniform thickness can be formed.

In the case of injection molding the cover composition into the cover, the cover composition extruded in the pellet form may be used for the injection molding, or the cover materials such as the base resin components, pigment and so on may be dry blended, followed by directly injection molding the blended materials. It is preferred to use upper and lower molds having a hemispherical cavity and pimples for forming the cover, wherein a part of the pimples also serves as a retractable hold pin. When molding the cover by the injection molding, the core is charged and held with the protruding hold pin, and the cover composition is charged and then cooled to form the cover. For example, the cover composition heated to 200° C. to 250° C. is charged for 0.5 to 5 seconds, into a mold held under the pressure of 9 MPa to 15 MPa, and the mold is opened after cooled for 10 to 60 seconds to obtain the cover.

The concave portions called "dimple" are usually formed on the surface of the cover when being molded. The total number of the dimples formed on the cover is preferably 200 or more and 500 or less. If the total number of the dimples is less than 200, the dimple effect is hardly obtained. On the other hand, if the total number of the dimples exceeds 500, the dimple effect is hardly obtained because the size of the respective dimples is small. The shape (shape in a plan view) of the dimples includes, for example, without any limitation, a circle, a polygonal shape such as a roughly triangular shape, a roughly quadrangular shape, a roughly pentagonal shape, a roughly hexagonal shape and the like, and other irregular shape. The shape of the dimples may be employed solely, or at least two of them may be used in combination.

The cover preferably has a thickness of 4.0 mm or less, more preferably 3.0 mm or less, and even more preferably 2.0 mm or less. If the thickness of the cover is 4.0 mm or less, the resilience and shot feeling of the obtained golf ball are better. The cover of the golf ball preferably has a thickness of 0.3 mm or more, more preferably 0.5 mm or more, even more preferably 0.8 mm or more, and most preferably 1.0 mm or more. If the thickness of the cover is less than 0.3 mm, the durability and wear resistance of the cover may deteriorate. If the cover has a plurality of layers, it is preferred that the total thickness of the cover layers falls within the above range.

The golf ball body having the cover molded thereon is ejected from the mold, and as necessary, is preferably subjected to surface treatments such as deburring, cleaning, and sandblast. If desired, a paint film or a mark may be formed thereon. The paint film preferably has a thickness of, but not limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to the continued use of the golf ball, and if the thickness of the paint film is more than 50 μm, the effect of the dimples is reduced, resulting in lowering flying performance of the golf ball.

[Golf Ball]

The construction of the golf ball according to the present invention is not particularly limited, as long as the golf ball comprises a spherical core and at least one cover layer covering the spherical core. The spherical core preferably has a single layered construction. This is because unlike a spherical core having a multi-layered construction, the spherical core having the single layered construction does not have an energy loss at the interface of the multi-layered construction when hitting, and thus has enhanced resilience. In addition, the cover has a construction composed of at least one layer, for example, a single layered construction, or a multi-layered construction composed of at least two layers. The golf ball according to the present invention includes, for example, a two-piece golf ball composed of a spherical core and a single layered cover disposed around the spherical core; a multi-piece golf ball composed of a spherical core, and at least two cover layers disposed around the spherical core (including a three-piece golf ball); and a wound golf ball composed of a spherical core, a rubber thread layer disposed around the spherical core, and a cover disposed around the rubber thread layer. The present invention can be suitably applied to any one of the above golf balls.

The golf ball according to the present invention preferably has a diameter ranging from 40 mm to 45 mm. In light of satisfying a regulation of US Golf Association (USGA), the diameter is particularly preferably 42.67 mm or more. In light of prevention of the air resistance, the diameter is more preferably 44 mm or less, particularly preferably 42.80 mm or less. In addition, the golf ball according to the present invention preferably has a mass of 40 g or more and 50 g or less. In light of obtaining greater inertia, the golf ball more preferably has a mass of 44 g or more, particularly preferably 45.00 g or more. In light of satisfying a regulation of USGA, the golf ball particularly preferably has a mass of 45.93 g or less.

When the golf ball according to the present invention has a diameter ranging from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.2 mm or more, even more preferably 2.4 mm or more, and is preferably 4.0 mm or less, more preferably 3.5 mm or less, even more preferably 3.4 mm or less. If the compression deformation amount is 2.0 mm or more, the golf ball does not become excessively hard and thus the shot feeling thereof becomes better. On the other hand, if the compression deformation amount is 4.0 mm or less, the resilience of the golf ball becomes better.

FIG. 1 is a partially cutaway sectional view showing a golf ball 1 according to one embodiment of the present invention. The golf ball 1 comprises a spherical core 2, and a cover 3 covering the spherical core 2. A plurality of dimples 31 are formed on a surface of the cover 3. Other portions than the dimples 31 on the surface of the golf ball 1 are lands 32. The golf ball 1 is also provided with a paint layer and a mark layer outside the cover 3, but these layers are not depicted.

Examples

Next, the present invention will be described in detail by way of examples. However, the present invention is not limited to the examples described below. Various changes and modifications without departing from the spirit of the present invention are included in the scope of the present invention.

[Evaluation Methods]

(1) Compression Deformation Amount (mm)

The deformation amount of the core or golf ball along the compression direction (shrinking amount of the core or golf ball along the compression direction), when applying a load from 98 N as an initial load to 1275 N as a final load to the core or golf ball, was measured.

(2) Coefficient of Restitution

A metal cylindrical object with a mass of 198.4 g was allowed to collide with each core or golf ball at a speed of 40 m/sec, and the speeds of the cylindrical object and the core or golf ball before and after the collision were measured. Based on these speeds and the mass of each object, the coefficient of restitution for each core or golf ball was calculated. The measurement was conducted by using twelve samples for each core or golf ball, and the average value was regarded as the coefficient of restitution for the core or golf ball. It is noted that the coefficient of restitution is shown as the difference from that of the golf ball No. 13.

(3) Core Hardness (Shore C Hardness)

The hardness measured at the surface of the core was adopted as the surface hardness of the core. In addition, the core was cut into two hemispheres to obtain a cut plane, and the hardness at the central point of the cut plane was measured. The hardness was measured with an automatic hardness tester (Digitest II, available from Bareiss company) using a detector of "Shore C".

(4) Slab Hardness (Shore D Hardness)

Sheets with a thickness of about 2 mm were produced by injection molding the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a detector of "Shore D".

(5) Flight Distance on Driver Shots

A W #1 driver provided with a metal head (XXIO, Shaft: S, loft angel: 11°, available from Dunlop Sports Limited) was installed on a swing robot M/C available from Golf Laboratories, Inc. The golf ball was hit at a head speed of 40 m/sec, and the flight distance (the distance from the launch point to the stop point) thereof was measured. It is noted that the measurement was conducted twelve times for each golf ball, and the average value thereof was adopted as the measurement value of the golf ball. In addition, the flight distance of each golf ball is shown as a difference from that of the golf ball No. 13 (i.e. flight distance difference=flight distance of each golf ball−flight distance of golf ball No. 13).

(6) Durability

A W #1 driver provided with a metal head (XXIO, Shaft: S, loft angel: 11°, available from Dunlop Sports Limited) was installed on a swing robot M/C available from Golf Laboratories, Inc. The golf ball was hit repeatedly at a head speed of 45 m/sec until a crack occurred, and the hitting number when the crack occurred was counted. It is noted that the measurement was conducted using twelve samples for each golf ball, and the average value thereof was adopted as the hitting number of the golf ball. In addition, the difference between the hitting number of each golf ball and the hitting number of the golf ball No. 13 (i.e. hitting number difference=hitting number of each golf ball−hitting number of golf ball No. 13) was calculated, and the durability was evaluated according to the following standard.

Evaluation Standard

G (good): hitting number difference is 0 or more.
P (poor): hitting number difference is less than 0.

(1) Production of Core

The rubber compositions having the formulations shown in Tables 1 to 4 were kneaded with a kneading roll, and heat-pressed in upper and lower molds, each having a hemispherical cavity, at 170° C. for 20 minutes to obtain spherical cores having a diameter of 39.8 mm. It is noted that the amount of barium sulfate was appropriately adjusted such that the obtained golf ball had a mass of 45.4 g.

TABLE 1-1

| | | | | Golf ball No. | | | | | | |
|---|---|---|---|---|---|---|---|---|---|---|
| | | | | 1 | 2 | 3 | 4 | 5 | 6 | 7 |
| Rubber composition | Amount (parts by mass) | (a) | BR730 | 100 | 100 | 100 | 100 | 100 | 100 | 100 |
| | | (b) and (e) | ZN-DA90S | 29 | 29 | 29 | 32 | 33 | 35 | 40 |
| | | (c) | Dicumyl peroxide | 0.8 | 0.8 | 0.8 | 0.8 | 0.8 | 0.8 | 0.8 |
| | | (d) | Oleic acid (C18: 1) | 1.0 | 3.0 | 5.0 | 10 | 15 | 20 | 30 |
| | | | Myristoleic acid (C14: 1) | — | — | — | — | — | — | — |
| | | | Palmitoleic acid (C16: 1) | — | — | — | — | — | — | — |
| | | | Eicosenoic acid (C20: 1) | — | — | — | — | — | — | — |
| | | | Erucic acid (C22: 1) | — | — | — | — | — | — | — |
| | | | Nervonic acid (C24: 1) | — | — | — | — | — | — | — |
| | | (e) | Zinc octanoate (C8) | 5.0 | 5.0 | 5.0 | 5.0 | 5.0 | 5.0 | 5.0 |
| | | (f) | Zinc oxide | 3.7 | 4.1 | 4.5 | 5.7 | 6.8 | 7.9 | 10.3 |
| | | (g) | PBDS | 0.63 | 0.63 | 0.63 | 0.63 | 0.63 | 0.63 | 0.63 |
| | | | Barium sulfate | *1) | *1) | *1) | *1) | *1) | *1) | *1) |
| | Amount of carbon-carbon double bond in (d) component (mmol/g) | | | 3.54 | 3.54 | 3.54 | 3.54 | 3.54 | 3.54 | 3.54 |
| | Molar ratio of total amount of carbon-carbon double bond ((d)/(b)) | | | 0.01 | 0.04 | 0.07 | 0.13 | 0.19 | 0.23 | 0.31 |
| | Molar ratio of carboxyl groups and carboxylate groups ((d + e)/(b)) | | | 0.16 | 0.19 | 0.22 | 0.27 | 0.32 | 0.36 | 0.42 |
| | Molar ratio of carboxyl groups and carboxylate groups ((d)/(e)) | | | 0.09 | 0.28 | 0.47 | 0.92 | 1.37 | 1.79 | 2.59 |
| | Total molar number of carboxyl groups and carboxylate groups in (d) component | | | 0.004 | 0.011 | 0.018 | 0.035 | 0.053 | 0.071 | 0.106 |
| | Total molar number of carboxyl groups and carboxylate groups in (e) component | | | 0.038 | 0.038 | 0.038 | 0.039 | 0.039 | 0.039 | 0.041 |
| | Total molar number of carboxyl groups and carboxylate groups ((d) + (e)) | | | 0.041 | 0.048 | 0.055 | 0.074 | 0.092 | 0.110 | 0.147 |
| | Total amount of (d) component and (e) component (parts by mass) | | | 8.9 | 10.9 | 12.9 | 18.2 | 23.3 | 28.5 | 39.0 |
| | Degree of neutralization (%) | | | 130 | 130 | 130 | 130 | 130 | 130 | 130 |

TABLE 1-1-continued

|  |  | Golf ball No. | | | | | | |
|---|---|---|---|---|---|---|---|---|
|  |  | 1 | 2 | 3 | 4 | 5 | 6 | 7 |
| Spherical core | Compression deformation amount (mm) | 3.8 | 3.8 | 3.8 | 3.8 | 3.8 | 3.8 | 3.8 |
|  | Coefficient of restitution | 0.003 | 0.007 | 0.010 | 0.005 | 0.002 | −0.015 | −0.030 |
|  | Center hardness Ho (Shore C) | 45 | 45 | 45 | 45 | 45 | 45 | 45 |
|  | Surface hardness Hs (Shore C) | 78 | 75 | 75 | 71 | 68 | 66 | 60 |
|  | Hardness difference (Hs − Ho) (Shore C) | 33 | 30 | 30 | 26 | 23 | 21 | 15 |
| Golf ball | Compression deformation amount (mm) | 3.3 | 3.3 | 3.3 | 3.3 | 3.3 | 3.3 | 3.3 |
|  | Coefficient of restitution | 0.003 | 0.007 | 0.010 | 0.005 | 0.002 | −0.015 | −0.030 |
|  | Flight distance on driver shots (yd) | 4.0 | 4.5 | 5.0 | 4.3 | 3.6 | −2.5 | −5.0 |
|  | Durability | G | G | G | G | G | G | G |

*1) Appropriate amount

TABLE 2-1

|  |  |  |  | Golf ball No. | | | | | | | |
|---|---|---|---|---|---|---|---|---|---|---|---|
|  |  |  |  | 8 | 9 | 10 | 11 | 12 | 13 | 14 | 15 |
| Rubber composition | Amount (parts by mass) | (a) | BR730 | 100 | 100 | 100 | 100 | 100 | 100 | 100 | 100 |
|  |  | (b) and (e) | ZN-DA90S | 29 | 29 | 29 | 29 | 29 | 28 | 28 | 28 |
|  |  | (c) | Dicumyl peroxide | 0.8 | 0.8 | 0.8 | 0.8 | 0.8 | 0.8 | 0.8 | 0.8 |
|  |  | (d) | Myristoleic acid (C14: 1) | 5.0 | — | — | — | — | — | — | — |
|  |  |  | Palmitoleic acid (C16: 1) | — | 5.0 | — | — | — | — | — | — |
|  |  |  | Eicosenoic acid (C20: 1) | — | — | 5.0 | — | — | — | — | — |
|  |  |  | Erucic acid (C22: 1) | — | — | — | 5.0 | — | — | — | — |
|  |  |  | Nervonic acid (C24: 1) | — | — | — | — | 5.0 | — | — | — |
|  |  |  | ricinoleic acid | — | — | — | — | — | — | — | 11.7 |
|  |  | (e) | Zinc octanoate (C8) | 5.0 | 5.0 | 5.0 | 5.0 | 5.0 | — | 5.0 | 5.0 |
|  |  | (f) | Zinc oxide | 4.7 | 4.6 | 4.4 | 4.3 | 4.2 | 5.0 | 5.0 | 5.0 |
|  |  | (g) | PBDS | 0.63 | 0.63 | 0.63 | 0.63 | 0.63 | 0.63 | 0.63 | 0.63 |
|  |  |  | Barium sulfate | *1) | *1) | *1) | *1) | *1) | *1) | *1) | *1) |
|  | Amount of carbon-carbon double bond in (d) component (mmol/g) | | | 4.42 | 3.93 | 3.22 | 2.95 | 2.73 | — | — | 3.35 |
|  | Molar ratio of total amount of carbon-carbon double bond ((d)/(b)) | | | 0.09 | 0.08 | 0.06 | 0.06 | 0.05 | — | — | 0.16 |
|  | Molar ratio of carboxyl groups and carboxylate groups ((d + e)/(b)) | | | 0.24 | 0.23 | 0.21 | 0.21 | 0.20 | — | 0.15 | 0.31 |
|  | Molar ratio of carboxyl groups and carboxylate groups ((d)/(e)) | | | 0.59 | 0.52 | 0.43 | 0.39 | 0.36 | — | — | 1.05 |
|  | Total molar number of carboxyl groups and carboxylate groups in (d) component | | | 0.022 | 0.020 | 0.016 | 0.015 | 0.014 | — | — | 0.04 |
|  | Total molar number of carboxyl groups and carboxylate groups in (e) component | | | 0.038 | 0.038 | 0.038 | 0.038 | 0.038 | — | — | 0.04 |
|  | Total molar number of carboxyl groups and carboxylate groups ((d) + (e)) | | | 0.060 | 0.057 | 0.054 | 0.052 | 0.051 | — | — | 0.08 |
|  | Total amount of (d) component and (e) component (parts by mass) | | | 12.9 | 12.9 | 12.9 | 12.9 | 12.9 | 2.8 | 7.8 | 19.5 |
|  | Degree of neutralization (%) | | | 130 | 130 | 130 | 130 | 130 | 150 | 144 | 126 |
| Spherical core | Compression deformation amount (mm) | | | 3.8 | 3.8 | 3.8 | 3.8 | 3.8 | 3.8 | 3.8 | 3.8 |
|  | Coefficient of restitution | | | 0.010 | 0.010 | 0.010 | 0.010 | 0.010 | Standard | 0.000 | 0.006 |
|  | Center hardness Ho (Shore C) | | | 45 | 45 | 45 | 45 | 45 | 55 | 45 | 45 |
|  | Surface hardness Hs (Shore C) | | | 75 | 75 | 75 | 75 | 75 | 80 | 80 | 72 |
|  | Hardness difference (Hs − Ho) (Shore C) | | | 30 | 30 | 30 | 30 | 30 | 25 | 35 | 27 |
| Golf ball | Compression deformation amount (mm) | | | 3.3 | 3.3 | 3.3 | 3.3 | 3.3 | 3.3 | 3.3 | 3.3 |
|  | Coefficient of restitution | | | 0.010 | 0.010 | 0.010 | 0.010 | 0.010 | Standard | 0.000 | 0.006 |
|  | Flight distance on driver shots (yd) | | | 5.0 | 5.0 | 5.0 | 5.0 | 5.0 | Standard | 2.0 | 3.0 |
|  | Durability | | | G | G | G | G | G | G | G | G |

*1) Appropriate amount

TABLE 3-1

|  |  |  |  | Golf ball No. | | | | | | | | | |
|---|---|---|---|---|---|---|---|---|---|---|---|---|---|
|  |  |  |  | 16 | 17 | 18 | 19 | 20 | 21 | 22 | 23 | 24 | 25 |
| Rubber composition | Amount (parts by mass) | (a) | BR730 | 100 | 100 | 100 | 100 | 100 | 100 | 100 | 100 | 100 | 100 |
|  |  | (b) and (e) | ZN-DA90S | 30 | 31 | 36 | 35 | 41 | 29 | 28 | 26 | 26 | 28 |
|  |  | (c) | Dicumyl peroxide | 0.8 | 0.8 | 0.8 | 0.8 | 0.8 | 0.8 | 0.8 | 0.8 | 0.8 | 0.8 |
|  |  | (d) | Oleic acid (C18: 1) | 5.0 | 5.0 | 5.0 | 5.0 | 5.0 | 5.0 | 5.0 | 5.0 | 5.0 | 5.0 |
|  |  | (e) | Octanoic acid (C8) | 0.8 | 2.5 | 4.1 | 6.6 | 12.3 | — | — | — | — | — |

TABLE 3-1-continued

|  |  |  | Golf ball No. | | | | | | | | | |
|---|---|---|---|---|---|---|---|---|---|---|---|---|
|  |  |  | 16 | 17 | 18 | 19 | 20 | 21 | 22 | 23 | 24 | 25 |
|  |  | Decanoic acid (C10) | — | — | — | — | — | 4.9 | — | — | — | — |
|  |  | Lauric acid (C12) | — | — | — | — | — | — | 5.7 | — | — | — |
|  |  | Myristic acid (C14) | — | — | — | — | — | — | — | 6.5 | — | — |
|  |  | Stearic acid (C18) | — | — | — | — | — | — | — | — | 8.1 | — |
|  | (f) | Zinc oxide | 4.5 | 5.2 | 6.4 | 7.2 | 9.9 | 5.6 | 5.5 | 5.3 | 5.3 | 4.0 |
|  | (g) | PBDS | 0.63 | 0.63 | 0.63 | 0.63 | 0.63 | 0.63 | 0.63 | 0.63 | 0.63 | 0.63 |
|  |  | Barium sulfate | *1) | *1) | *1) | *1) | *1) | *1) | *1) | *1) | *1) | *1) |
|  | Amount of carbon-carbon double bond in (d) component (mmol/g) | | 3.54 | 3.54 | 3.54 | 3.54 | 3.54 | 3.54 | 3.54 | 3.54 | 3.54 | 3.54 |
|  | Molar ratio of total amount of carbon-carbon double bond ((d)/(b)) | | 0.07 | 0.07 | 0.06 | 0.06 | 0.05 | 0.07 | 0.07 | 0.08 | 0.08 | 0.07 |
|  | Molar ratio of carboxyl groups and carboxylate groups ((d + e)/(b)) | | 0.13 | 0.17 | 0.18 | 0.24 | 0.33 | 0.22 | 0.23 | 0.24 | 0.24 | 0.11 |
|  | Molar ratio of carboxyl groups and carboxylate groups ((d)/(e)) | | 1.17 | 0.66 | 0.44 | 0.31 | 0.18 | 0.47 | 0.47 | 0.48 | 0.48 | 2.00 |
|  | Total molar number of carboxyl groups and carboxylate groups in (d) component | | 0.018 | 0.018 | 0.018 | 0.018 | 0.018 | 0.018 | 0.018 | 0.018 | 0.018 | 0.018 |
|  | Total molar number of carboxyl groups and carboxylate groups in (e) component | | 0.015 | 0.027 | 0.040 | 0.057 | 0.098 | 0.038 | 0.037 | 0.037 | 0.037 | 0.009 |
|  | Total molar number of carboxyl groups and carboxylate groups ((d) + (e)) | | 0.033 | 0.045 | 0.058 | 0.074 | 0.116 | 0.055 | 0.055 | 0.054 | 0.054 | 0.027 |
|  | Total amount of (d) component and (e) component (parts by mass) | | 8.8 | 10.6 | 12.7 | 15.1 | 21.4 | 12.8 | 13.5 | 14.1 | 15.7 | 7.8 |
|  | Degree of neutralization (%) | | 130 | 130 | 130 | 130 | 130 | 130 | 130 | 130 | 130 | 130 |
| Sherical core | Compression deformation amount (mm) | | 3.8 | 3.8 | 3.8 | 3.8 | 3.8 | 3.8 | 3.8 | 3.8 | 3.8 | 3.8 |
|  | Coefficient of restitution | | 0.003 | 0.007 | 0.010 | 0.005 | −0.015 | 0.010 | 0.010 | 0.010 | 0.010 | 0.010 |
|  | Center hardness Ho (Shore C) | | 54 | 53 | 45 | 45 | 45 | 45 | 45 | 45 | 45 | 55 |
|  | Surface hardness Hs (Shore C) | | 75 | 75 | 75 | 75 | 70 | 75 | 75 | 75 | 75 | 75 |
|  | Hardness difference (Hs − Ho) (Shore C) | | 21 | 22 | 30 | 30 | 25 | 30 | 30 | 30 | 30 | 20 |
| Golf ball | Compression deformation amount (mm) | | 3.3 | 3.3 | 3.3 | 3.3 | 3.3 | 3.3 | 3.3 | 3.3 | 3.3 | 3.3 |
|  | Coefficient of restitution | | 0.010 | 0.010 | 0.010 | 0.005 | −0.015 | 0.010 | 0.010 | 0.010 | 0.010 | 0.010 |
|  | Flight distance on driver shots (yd) | | 1.8 | 1.8 | 5.0 | 4.3 | −2.5 | 5.0 | 5.0 | 5.0 | 5.0 | 1.7 |
|  | Durability | | G | G | G | G | G | G | G | G | G | G |

*1) Appropriate amount

TABLE 4-1

|  |  |  |  | Golf ball No. | | | | | | | | | |
|---|---|---|---|---|---|---|---|---|---|---|---|---|---|
|  |  |  |  | 26 | 27 | 3 | 28 | 29 | 30 | 31 | 32 | 33 | 25 |
| Rubber composition | Amount (parts by mass) | (a) | BR730 | 100 | 100 | 100 | 100 | 100 | 100 | 100 | 100 | 100 | 100 |
|  |  | (b) | ZN-DA90S | 28 | 29 | 29 | 31 | 35 | 29 | 28 | 27 | 27 | 28 |
|  |  | and (e) |  |  |  |  |  |  |  |  |  |  |  |
|  |  | (c) | Dicumyl peroxide | 0.8 | 0.8 | 0.8 | 0.8 | 0.8 | 0.8 | 0.8 | 0.8 | 0.8 | 0.8 |
|  |  | (d) | Oleic acid (C18: 1) | 5.0 | 5.0 | 5.0 | 5.0 | 5.0 | 5.0 | 5.0 | 5.0 | 5.0 | 5.0 |
|  |  | (e) | Zinc octanoate (C8) | 1.0 | 3.0 | 5.0 | 8.0 | 15.0 | — | — | — | — | — |
|  |  |  | Zinc decanoate (C10) | — | — | — | — | — | 5.8 | — | — | — | — |
|  |  |  | Zinc laurate (C12) | — | — | — | — | — | — | 6.6 | — | — | — |
|  |  |  | Zince myristate (C14) | — | — | — | — | — | — | — | 7.4 | — | — |
|  |  |  | Zinc stearate (C18) | — | — | — | — | — | — | — | — | 9.0 | — |
|  |  | (f) | Zinc oxide | 4.1 | 4.3 | 4.5 | 4.9 | 5.8 | 4.5 | 4.3 | 4.2 | 4.2 | 4.0 |
|  |  | (g) | PBDS | 0.63 | 0.63 | 0.63 | 0.63 | 0.63 | 0.63 | 0.63 | 0.63 | 0.63 | 0.63 |
|  |  |  | Barium sulfate | *1) | *1) | *1) | *1) | *1) | *1) | *1) | *1) | *1) | *1) |
|  | Amount of carbon-carbon double bond in (d) component (mmol/g) | | | 3.54 | 3.54 | 3.54 | 3.54 | 3.54 | 3.54 | 3.54 | 3.54 | 3.54 | 3.54 |
|  | Molar ratio of total amount of carbon-carbon double bond ((d)/(b)) | | | 0.07 | 0.07 | 0.07 | 0.07 | 0.06 | 0.07 | 0.07 | 0.08 | 0.08 | 0.07 |
|  | Molar ratio of carboxyl groups and carboxylate groups ((d + e)/(b)) | | | 0.13 | 0.17 | 0.22 | 0.27 | 0.38 | 0.22 | 0.23 | 0.23 | 0.23 | 0.11 |
|  | Molar ratio of carboxyl groups and carboxylate groups ((d)/(e)) | | | 1.22 | 0.67 | 0.47 | 0.32 | 0.18 | 0.47 | 0.47 | 0.48 | 0.48 | 2.00 |
|  | Total molar number of carboxyl groups and carboxylate groups in (d) component | | | 0.018 | 0.018 | 0.018 | 0.018 | 0.018 | 0.018 | 0.018 | 0.018 | 0.018 | 0.018 |
|  | Total molar number of carboxyl groups and carboxylate groups in (e) component | | | 0.015 | 0.026 | 0.038 | 0.055 | 0.096 | 0.038 | 0.037 | 0.037 | 0.037 | 0.009 |

TABLE 4-1-continued

| | | Golf ball No. | | | | | | | | | |
|---|---|---|---|---|---|---|---|---|---|---|---|
| | | 26 | 27 | 3 | 28 | 29 | 30 | 31 | 32 | 33 | 25 |
| | Total molar number of carboxyl groups and carboxylate groups ((d) + (e)) | 0.032 | 0.044 | 0.055 | 0.073 | 0.114 | 0.055 | 0.055 | 0.055 | 0.055 | 0.027 |
| | Total amount of (d) component and (e) component (parts by mass) | 8.8 | 10.9 | 12.9 | 16.1 | 23.5 | 13.7 | 14.4 | 15.1 | 16.7 | 7.8 |
| | Degree of neutralization (%) | 130 | 130 | 130 | 130 | 130 | 130 | 130 | 130 | 130 | 130 |
| Spherical core | Compression deformation amount (mm) | 3.8 | 3.8 | 3.8 | 3.8 | 3.8 | 3.8 | 3.8 | 3.8 | 3.8 | 3.8 |
| | Coefficient of restitution | 0.003 | 0.007 | 0.010 | 0.005 | −0.015 | 0.010 | 0.010 | 0.010 | 0.010 | 0.010 |
| | Center hardness Ho (Shore C) | 45 | 45 | 45 | 45 | 45 | 45 | 45 | 45 | 45 | 55 |
| | Surface hardness Hs (Shore C) | 75 | 75 | 75 | 75 | 70 | 75 | 75 | 75 | 75 | 75 |
| | Hardness difference (Hs − Ho) (Shore C) | 30 | 30 | 30 | 30 | 25 | 30 | 30 | 30 | 30 | 20 |
| Golf ball | Compression deformation amount (mm) | 3.3 | 3.3 | 3.3 | 3.3 | 3.3 | 3.3 | 3.3 | 3.3 | 3.3 | 3.3 |
| | Coefficient of restitution | 0.003 | 0.007 | 0.010 | 0.005 | −0.015 | 0.010 | 0.010 | 0.010 | 0.010 | 0.010 |
| | Flight distance on driver shots (yd) | 4.0 | 4.5 | 5.0 | 4.3 | −2.5 | 5.0 | 5.0 | 5.0 | 5.0 | 1.7 |
| | Durability | G | G | G | G | G | G | G | G | G | G |

*1) Appropriate amount

The materials used in Tables 1 to 4 are shown below.

BR730: high cis-polybutadiene rubber (cis-1,4-bond amount=96 mass %, 1,2-vinyl bond amount=1.3 mass %, Mooney viscosity ($ML_{1+4}$ (100° C.))=55, Molecular weight distribution (Mw/Mn)=3) available from JSR Corporation ZN-DA90S: zinc acrylate (containing 10 mass % of zinc stearate) available from Nisshoku Techno Fine Chemical Co., Ltd.

Dicumyl peroxide: available from Tokyo Chemical Industry Co., Ltd.

Oleic acid: unsaturated fatty acid (C18; in the formula (2), $R^{11}$ has a carbon number of 8, $R^{12}$ has a carbon number of 7, carbon atom number of $R^{11}$/carbon atom number of $R^{12}$=1.1) available from Tokyo Chemical Industry Co., Ltd.

Myristoleic acid: unsaturated fatty acid (C14; in the formula (2), $R^1$ has a carbon atoms of 4, $R^{12}$ has a carbon atoms of 7, carbon atom number of $R^{11}$/carbon atom number of $R^{12}$=0.6) available from Tokyo Chemical Industry Co., Ltd.

Palmitoleic acid: unsaturated fatty acid (C16; in the formula (2), $R^{11}$ has a carbon atoms of 6, $R^{12}$ has a carbon atoms of 7, carbon atom number of $R^{11}$/carbon atom number of $R^{12}$=0.9) available from Tokyo Chemical Industry Co., Ltd.

Eicosenoic acid: unsaturated fatty acid (C20; in the formula (2), $R^{11}$ has a carbon atoms of 8, $R^{12}$ has a carbon atoms of 9, carbon atom number of $R^{11}$/carbon atom number of $R^{12}$=0.9) available from Tokyo Chemical Industry Co., Ltd.

Erucic acid: unsaturated fatty acid (C22; in the formula (2), $R^{11}$ has a carbon atoms of 8, $R^{12}$ has a carbon atoms of 11, carbon atom number of $R^{11}$/carbon atom number of $R^{12}$=0.7) available from Tokyo Chemical Industry Co., Ltd.

Nervonic acid: unsaturated fatty acid (C24; in the formula (2), $R^{11}$ has a carbon atoms of 8, $R^{12}$ has a carbon atoms of 13, carbon atom number of $R^{11}$/carbon atom number of $R^{12}$=0.6) available from Tokyo Chemical Industry Co., Ltd.

Ricinoleic acid: unsaturated fatty acid (C18; in the formula (2), $R^{11}$ has a carbon atoms of 8, $R^{12}$ has a carbon atoms of 7, carbon atom number of $R^{11}$/carbon atom number of $R^{12}$=1.1, $R^{11}$ has one hydroxy group as a substituent) (purity: 80 mass %) available from Tokyo Chemical Industry Co., Ltd.

Octanoic acid: saturated fatty acid (C8) available from Tokyo Chemical Industry Co., Ltd.

Decanoic acid: saturated fatty acid (C10) available from Tokyo Chemical Industry Co., Ltd.

Lauric acid: saturated fatty acid (C12) available from Tokyo Chemical Industry Co., Ltd.

Myristic acid: saturated fatty acid (C14) available from Tokyo Chemical Industry Co., Ltd.

Stearic acid: saturated fatty acid (C18) available from Tokyo Chemical Industry Co., Ltd.

Zinc octanoate: available from Mitsuwa Chemicals Co., Ltd.

Zinc decanoate: available from Mitsuwa Chemicals Co., Ltd.

Zinc laurate: available from Mitsuwa Chemicals Co., Ltd.

Zinc myristate: available from NOF Corporation

Zinc stearate: available from Nihon Joryu Kogyo Co., Ltd.

Zinc oxide: "Ginrei R" available from Toho Zinc Co., Ltd.

PBDS: bis(pentabromophenyl) disulfide available from Kawaguchi Chemical Industry Co., Ltd.

Barium sulfate: "Barium Sulfate BD" available from Sakai Chemical Industry Co., Ltd.

(2) Production of Cover and Golf Ball

The cover materials having the formulations shown in Table 5 were extruded with a twin-screw kneading extruder to prepare the cover composition in a pellet form. The extruding conditions of the cover composition were a screw diameter of 45 mm, a screw rotational speed of 200 rpm, and screw L/D=35, and the mixtures were heated to 160° C. to 230° C. at the die position of the extruder. The obtained cover composition was injection molded on the spherical core obtained as described above to produce the golf balls having a spherical core and a cover covering the core. The cover has a thickness of 1.5 mm.

TABLE 5

| Cover composition | | |
|---|---|---|
| Formulation (parts by mass) | Himilan 1605 | 50 |
| | Himilan 1706 | 50 |
| | Titanium oxide | 4 |
| Slab hardness (Shore D) | | 65 |

The materials used in Table 5 are shown below.

Himilan (registered trademark) 1605: sodium ion neutralized ethylene-methacrylic acid copolymer ionomer resin available from Du Pont-Mitsui Polychemicals Co., Ltd.

Himilan 1706: zinc ion neutralized ethylene-methacrylic acid copolymer ionomer resin available from Du Pont-Mitsui Polychemicals Co., Ltd.

Titanium oxide: A220 available from Ishihara Sangyo Kaisha, Ltd.

Evaluation results of the golf balls are shown in Tables 1 to 4. The golf balls No. 1 to 5, 8 to 12, 15 to 19, 21 to 24, 26 to 28, and 30 to 33 are the cases that the spherical core is formed from a rubber composition containing (a) a base rubber, (b) a co-crosslinking agent, (c) a crosslinking initiator, (d) an unsaturated fatty acid and/or a metal salt thereof, and (e) a saturated fatty acid and/or a metal salt thereof. Each of these golf balls has higher resilience and travel a greater flight distance on driver shots than the golf ball No. 13. It is noted that the golf balls No. 6, 7, 20 and 29 have an excess amount of the (d) component or the (e) component, thus the resilience thereof is not improved.

The golf ball No. 14 is the case that the (d) component is not contained. This golf ball No. 14 travels a greater flight distance on driver shots than the golf ball No. 13, however, the flight distance improvement effect thereof is very small. The golf ball No. 25 is the case that the (e) component is contained in a small amount. This golf ball No. 25 has higher resilience and travels greater flight distance on driver shots than the golf ball No. 13, however, the flight distance improvement effect thereof is small.

This application is based on Japanese patent application No. 2016-130633 filed on Jun. 30, 2016, and No. 2016-231157 filed on Nov. 29, 2016, the contents of which are hereby incorporated by reference.

The invention claimed is:

1. A golf ball having a spherical core and at least one cover layer covering the spherical core, wherein the spherical core is formed from a rubber composition containing:
   (a) a base rubber,
   (b) a metal salt of α,β-unsaturated carboxylic acid having 3 to 8 carbon atoms as a co-crosslinking agent,
   (c) a crosslinking initiator,
   (d) an unsaturated fatty acid and/or a metal salt thereof (excluding an α,β-unsaturated carboxylic acid having 3 to 8 carbon atoms and/or a metal salt thereof), and
   (e) a saturated fatty acid and/or a metal salt thereof.

2. The golf ball according to claim 1, wherein a ratio ((d) component/(e) component) of a total molar number of carboxyl groups and carboxylate groups in the (d) component to a total molar number of carboxyl groups and carboxylate groups in the (e) component ranges from 0.10 to 2.4.

3. The golf ball according to claim 1, wherein an amount of carbon-carbon double bond per unit mass of (d) the unsaturated fatty acid and/or the metal salt thereof ranges from 1.00 mmol/g to 10.00 mmol/g.

4. The golf ball according to claim 1, wherein a ratio ((d) component/(b) component) of a total molar number of carbon-carbon double bonds in (d) the unsaturated fatty acid and/or the metal salt thereof to a total molar number of carbon-carbon double bonds in (b) the metal salt of α,β-unsaturated carboxylic acid having 3 to 8 carbon atoms ranges from 0.01 to 0.20.

5. The golf ball according to claim 1, wherein (d) the unsaturated fatty acid and/or the metal salt thereof is an unsaturated fatty acid having 4 to 33 carbon atoms and/or a metal salt thereof.

6. The golf ball according to claim 1, wherein (d) the unsaturated fatty acid and/or the metal salt thereof is an unsaturated fatty acid having one or two carbon-carbon double bonds and/or a metal salt thereof.

7. The golf ball according to claim 1, wherein (d) the unsaturated fatty acid and/or the metal salt thereof is an unsaturated fatty acid represented by the formula (1) and/or a metal salt thereof:

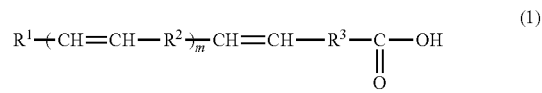

wherein, $R^1$ represents a hydrogen atom, or an alkyl group having 1 to 30 carbon atoms and optionally having a substituent; $R^2$ represents an alkylene group having 1 to 28 carbon atoms and optionally having a substituent; $R^3$ represents a single bond, or an alkylene group having 1 to 30 carbon atoms and optionally having a substituent; and m represents a natural number ranging from 0 to 5, and in the case that m ranges from 2 to 5, plural $R^2$ may be identical to or different from each other.

8. The golf ball according to claim 1, wherein (d) the unsaturated fatty acid and/or the metal salt thereof is a linear unsaturated fatty acid and/or a metal salt thereof.

9. The golf ball according to claim 1, wherein the rubber composition contains (d) the unsaturated fatty acid and/or the metal salt thereof in an amount ranging from 1 part by mass to 35 parts by mass with respect to 100 parts by mass of (a) the base rubber.

10. The golf ball according to claim 1, wherein the rubber composition has a degree of neutralization ranging from 100 mole % to 300 mole %.

11. The golf ball according to claim 1, wherein the rubber composition further contains (g) an organic sulfur compound.

12. The golf ball according to claim 11, wherein (g) the organic sulfur compound is at least one selected from the group consisting of thiophenols, diphenyl disulfides, thionaphthols, thiuram disulfides, and metal salts thereof.

13. The golf ball according to claim 11, wherein the rubber composition contains (g) the organic sulfur compound in an amount ranging from 0.05 part by mass to 5.0 parts by mass with respect to 100 parts by mass of (a) the base rubber.

14. The golf ball according to claim 1, wherein the rubber composition contains (b) the metal salt of α,β-unsaturated carboxylic acid having 3 to 8 carbon atoms in an amount ranging from 15 parts by mass to 50 parts by mass with respect to 100 parts by mass of (a) the base rubber.

15. The golf ball according to claim 1, wherein (e) the saturated fatty acid and/or the metal salt thereof is a saturated fatty acid having 4 to 30 carbon atoms and/or a metal salt thereof.

16. The golf ball according to claim 15, wherein in the case that a saturated fatty acid having 4 to 17 carbon atoms and/or a metal salt thereof is used as (e) the saturated fatty acid and/or the metal salt thereof, the rubber composition contains (e) the saturated fatty acid and/or the metal salt thereof in an amount ranging from 1 part by mass to 14 parts by mass with respect to 100 parts by mass of (a) the base rubber, or in the case that a saturated fatty acid having 18 to 30 carbon atoms and/or a metal salt thereof is used as (e) the saturated fatty acid and/or the metal salt thereof, the rubber composition contains (e) the saturated fatty acid and/or the metal salt thereof in an amount ranging from 4 parts by mass to 35 parts by mass with respect to 100 parts by mass of (a) the base rubber.

17. The golf ball according to claim 1, wherein a ratio (((d) component+(e) component)/(b) component) of a total molar number of carboxyl groups and carboxylate groups in the (d) component and the (e) component to a total molar number of carboxyl groups and carboxylate groups in the (b) component ranges from 0.01 to 0.25.

18. The golf ball according to claim 1, wherein a total molar number of carboxyl groups and carboxylate groups in the (d) component ranges from 0.001 to 0.065 and a total molar number of carboxyl groups and carboxylate groups in the (e) component ranges from 0.010 to 0.090, with respect to 100 parts by mass of (a) the base rubber.

19. The golf ball according to claim 1, wherein (d) the unsaturated fatty acid and/or the metal salt thereof is a linear unsaturated fatty acid having 4 to 33 carbon atoms and having one or two carbon-carbon double bonds and/or a metal salt thereof, an amount of carbon-carbon double bond per unit mass of (d) the unsaturated fatty acid and/or the metal salt thereof ranges from 1.00 mmol/g to 10.00 mmol/g, the rubber composition contains (d) the unsaturated fatty acid and/or the metal salt thereof in an amount ranging from 1 part by mass to 35 parts by mass with respect to 100 parts by mass of (a) the base rubber, a ratio ((d) component/(e) component) of a total molar number of carboxyl groups and carboxylate groups in the (d) component to a total molar number of carboxyl groups and carboxylate groups in the (e) component ranges from 0.10 to 2.4, and a ratio ((d) component/(b) component) of a total molar number of carbon-carbon double bonds in (d) the unsaturated fatty acid and/or the metal salt thereof to a total molar number of carbon-carbon double bonds in (b) the metal salt of $\alpha,\beta$-unsaturated carboxylic acid having 3 to 8 carbon atoms ranges from 0.01 to 0.20.

* * * * *